US012783572B2

(12) United States Patent
Wang et al.

(10) Patent No.: US 12,783,572 B2
(45) Date of Patent: Nov. 3, 2026

(54) MACHINE LEARNING BASED DATASET DETECTION

(71) Applicant: Capital One Services, LLC, McLean, VA (US)

(72) Inventors: Xiaofei Wang, Bellevue, WA (US); Jason Kitson, Falls Church, VA (US); Sathi Chowdhury, San Ramon, CA (US); Vamsi Kunaparaju, Herndon, VA (US); Andrew Keffalas, Falls Church, VA (US); Omar Sharifali, San Francisco, CA (US); Anindya Misra, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 259 days.

(21) Appl. No.: 17/337,598

(22) Filed: Jun. 3, 2021

(65) Prior Publication Data

US 2022/0391734 A1 Dec. 8, 2022

(51) Int. Cl.

*G06F 16/35* (2025.01)
*G06F 16/11* (2019.01)
*G06F 16/13* (2019.01)
*G06F 16/16* (2019.01)
*G06N 5/047* (2023.01)
*G06N 20/00* (2019.01)

(52) U.S. Cl.

CPC .............. *G06F 16/35* (2019.01); *G06F 16/11* (2019.01); *G06F 16/13* (2019.01); *G06F 16/166* (2019.01); *G06N 5/047* (2013.01); *G06N 20/00* (2019.01)

(58) Field of Classification Search

CPC ........ G06F 16/13; G06F 16/166; G06F 16/35; G06F 16/245; G06F 16/285; G06F 16/953; G06N 20/00; H04L 43/08

See application file for complete search history.

(56) References Cited

U.S. PATENT DOCUMENTS 5,890,147 A * 3/1999 Peltonen ................ G06F 16/93 707/999.102
9,858,280 B2 * 1/2018 Lee ...................... G06F 16/278
10,417,180 B1 * 9/2019 Patwardhan .......... G06F 16/128
11,151,094 B1 * 10/2021 Yang .................... G06F 16/128
2006/0225072 A1 * 10/2006 Lari ......................... G06F 8/71 717/169

(Continued)

*Primary Examiner* — Kavita Stanley
*Assistant Examiner* — Jedidiah P Ferrer
(74) *Attorney, Agent, or Firm* — Harrity & Harrity, LLP

(57) ABSTRACT

In some implementations, a system may receive inventory data associated with a data storage system. The inventory data identifies file paths for objects stored in the data storage system. The system may detect patterns in prefixes of the file paths using one or more trained machine learning models. The system may normalize the prefixes of the file paths based on the patterns detected in the prefixes. The system may detect datasets of the objects stored in the data storage system based on the normalized prefixes. The system may compare prefixes associated with the detected datasets with prefixes associated with a set of registered datasets that are registered with a metadata repository. The system may determine, based on comparing the prefixes associated with the detected datasets and the prefixes associated with the set of registered datasets, a respective registration classification for each detected dataset.

19 Claims, 10 Drawing Sheets

| Bucket | Detected datasets | Registered dataset | Classification | Total Objects | Similarity Score |
|---|---|---|---|---|---|
| Cmlcof-acbseodfiles-us-east-1-prod | eod_files/data/temp/raw/onelake/DSLWLR.DAT | eod_files/data/temp/raw/onelake/DSLWLR.DAT | Already been registered | 1 | 1 |
| coaf-conduent | efg-inbound/ACS.COAF.DDE.PLSAUDLY.ACTIVITY.CODEDEF.{date}.trl | efg-inbound/ACS.COAF.DDE.PLSAUDLY.ACTIVITY.CODEDEF.YYYYMMDD.dat | Likely already been registered | 214 | 0.9275 |
| coaf-conduent | efg-inbound/ACS.COAF.DDE.**PLSAUDLY**.ACTUNITLOOKUP.{date}.zip | efg-inbound/ACS.COAF.DDE.**PLSAUDLY**.ACTUNITLOOKUP.CCYYMMDD.zip | Need to be registered | 5 | 0.7257 |
| coaf-conduent | YdVjD6FTLfONHo_INbSe2s26Tr.Jh59T | Prod/data/optmzd/salesforce/orig/src/cohl-orign-salesforce-leadhistory.par quet | No need to be registered | 1 | 0 |

(56) References Cited

U.S. PATENT DOCUMENTS

| | | | | |
|---|---|---|---|---|
| 2013/0031061 | A1* | 1/2013 | Jagota | G06Q 30/01 707/690 |
| 2015/0135262 | A1* | 5/2015 | Porat | G06F 21/552 726/1 |
| 2017/0195310 | A1* | 7/2017 | Tyler | G06F 16/9535 |
| 2017/0262523 | A1* | 9/2017 | Epstein | G06F 16/285 |
| 2017/0272265 | A1* | 9/2017 | Okazato | G06F 3/1454 |
| 2018/0365573 | A1* | 12/2018 | Sultana | G06N 20/00 |
| 2019/0303796 | A1* | 10/2019 | Balasubramanian | G06F 40/30 |
| 2020/0012811 | A1* | 1/2020 | Walters | G06F 16/335 |
| 2020/0159947 | A1* | 5/2020 | Shenefiel | G06F 21/577 |
| 2020/0279004 | A1* | 9/2020 | Serdy | G06F 16/906 |
| 2021/0056110 | A1* | 2/2021 | Bong | G06F 16/1873 |
| 2021/0182659 | A1* | 6/2021 | Makhija | G06F 16/288 |
| 2021/0319179 | A1* | 10/2021 | Muffat | G06F 16/355 |
| 2022/0050828 | A1* | 2/2022 | Wu | G06F 18/24 |
| 2022/0197961 | A1* | 6/2022 | Baek | G06F 16/958 |
| 2022/0350814 | A1* | 11/2022 | Owen | G06F 16/35 |

* cited by examiner

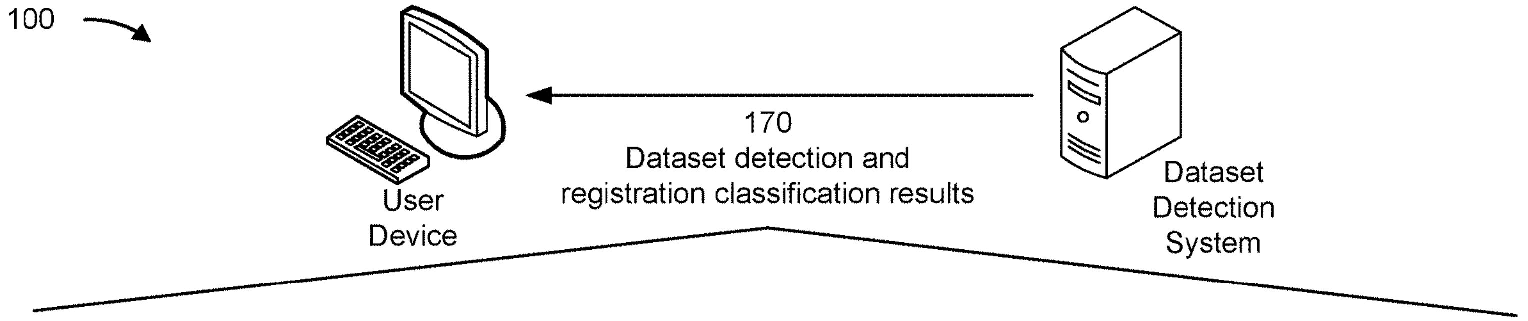

| Bucket | Detected datasets | Registered dataset | Classification | Total Objects | Similarity Score |
|---|---|---|---|---|---|
| Cmlcof-acbseodfiles-us-east-1-prod | eod_files/data/temp/raw/onelake/DSLWLR.DAT | eod_files/data/temp/raw/onelake/DSLWLR.DAT | Already been registered | 1 | 1 |
| coaf-conduent | efg-inbound/ACS.COAF.DDE.PLSAUDLY.ACTIVITY.CODEDEF.{date}.trl | efg-inbound/ACS.COAF.DDE.PLSAUDLY.ACTIVITY.CODEDEF.YYYYMMDD.dat | Likely already been registered | 214 | 0.9275 |
| coaf-conduent | efg-inbound/ACS.COAF.DDE.**PLSAUDLY**.ACTUNITLOOKUP.{date}.zip | efg-inbound/ACS.COAF.DDE.**PLSAUDLY**.ACTUNITLOOKUP.CCYYMMDD.zip | Need to be registered | 5 | 0.7257 |
| coaf-conduent | YdVjD6FTLfONHo_INbSe2s26Tr.Jh59T | Prod/data/optmzd/salesforce/orig/src/cohl-orign-salesforce-leadhistory.par quet | No need to be registered | 1 | 0 |

FIG. 1F

MACHINE LEARNING BASED DATASET DETECTION

BACKGROUND

Data storage systems are used to store large amounts of data for users, enterprises, or organizations, among other examples. Cloud storage systems are network-based storage systems that are typically provided through a cloud computing provider that manages and operates data storage as a service. One type of cloud storage system is an object storage system. Object storage systems, such as Amazon Simple Storage Service (S3), Google Cloud Storage, or Microsoft Azure, among other examples, manage data as objects and allow for retention of large amounts of unstructured data. Other types of cloud storage systems include file storage systems and block storage systems.

SUMMARY

In some implementations, a system for detecting datasets includes one or more memories, and one or more processors, communicatively coupled to the one or more memories, configured to: receive inventory data associated with a data storage system, wherein the inventory data identifies file paths for objects stored in the data storage system; detect patterns in prefixes of the file paths using one or more trained machine learning models; normalize the prefixes of the file paths based on the patterns detected in the prefixes, resulting in normalized prefixes for the objects stored in the data storage system; detect datasets of the objects stored in the data storage system based on the normalized prefixes, resulting in detected datasets; compare prefixes associated with the detected datasets with prefixes associated with a set of registered datasets that are registered with a metadata repository; and determine, based on comparing the prefixes associated with the detected datasets and the prefixes associated with the set of registered datasets, a respective registration classification for each detected dataset.

In some implementations, a method of detecting datasets includes receiving, by a system, inventory data associated with a data storage system, wherein the inventory data identifies file paths for objects stored in the data storage system; detecting, by the system, patterns in prefixes of the file paths using one or more trained machine learning models; normalizing, by the system, the prefixes of the file paths based on the patterns detected in the prefixes, resulting in normalized prefixes for the objects stored in the data storage system; detecting, by the system, datasets of the objects stored in the data storage system based on the normalized prefixes, resulting in detected datasets; comparing, by the system, prefixes associated with the detected datasets with prefixes associated with a set of registered datasets that are registered with a metadata repository; and determining, by the system, based on comparing the prefixes associated with the detected datasets and the prefixes associated with the set of registered datasets, a respective registration classification for each detected dataset.

In some implementations, a non-transitory computer-readable medium storing a set of instructions includes one or more instructions that, when executed by one or more processors of a device, cause the device to: receive inventory data associated with a data storage system, wherein the inventory data identifies file paths for objects stored in the data storage system; detect patterns in prefixes of the file paths using one or more trained machine learning models; normalize the prefixes of the file paths based on the patterns detected in the prefixes, resulting in normalized prefixes for the objects stored in the data storage system; detect datasets of the objects stored in the data storage system based on the normalized prefixes, resulting in detected datasets; compare prefixes associated with the detected datasets with prefixes associated with a set of registered datasets that are registered with a metadata repository; and determine, based on comparing the prefixes associated with the detected datasets and the prefixes associated with the set of registered datasets, a respective registration classification for each detected dataset.

BRIEF DESCRIPTION OF THE DRAWINGS

FIGS. 1A-1F are diagrams of an example implementation relating to machine learning based dataset detection.

DETAILED DESCRIPTION

Figure 1A:
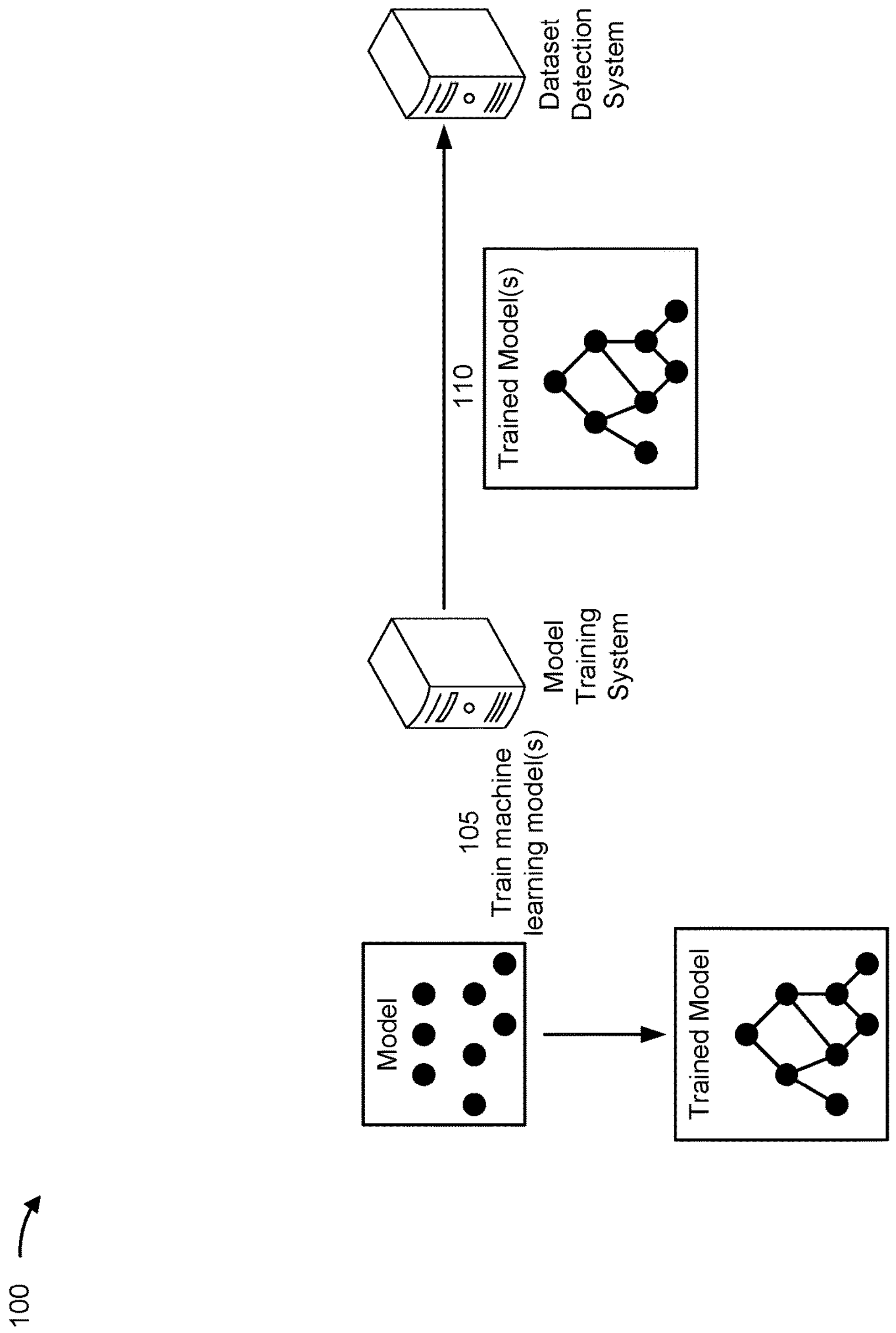

The following detailed description of example implementations refers to the accompanying drawings. The same reference numbers in different drawings may identify the same or similar elements.

An enterprise or organization may store a large amount of data (e.g., billions of files or objects) in a cloud-based data storage system, such as Amazon Simple Storage Service (S3), among other examples. Metadata, for the data stored in the data storage system, may be stored, tracked, and/or managed by a metadata repository. A metadata procedure for an enterprise may require metadata information for data stored in the data storage system, such as data created by, created for, or used by the enterprise, and such data may be registered as datasets in the metadata repository. A dataset is a collection of related sets of information (e.g., data, objects, and/or files) that has a common structure, format, and/or schema, and is stored in a set of semantically related datastores.

In many cases, users may store data in the data storage system without registering corresponding datasets in the metadata repository. As a result, a large number of objects/files in the data storage system may be missing metadata information, and such objects/files may not be tracked and/or managed by the metadata repository. However, there is no reliable metric available to evaluate completeness of the metadata repository with respect to the data stored in the data storage system. Due to the large number of objects/files stored in the data storage system (e.g., billions of object/files), it may be impossible to review all of the stored objects/files and validate which objects/files need to be registered as datasets in the metadata repository. Accordingly, a system that performs automated validation of whether objects/files, stored in a data storage system, are registered as datasets in a metadata repository, may be beneficial. However, it may be difficult for an automated system to accurately, efficiently, and securely detect datasets in the large quantity of stored objects/files in the data storage system and determine whether or not such detected datasets are registered in the metadata repository. For example, a possible solution for automating dataset detection may involve scanning the physical files stored the data storage system to determine whether files share the same schema. However, the access to the physical files may be restricted due to the physical files containing confidential information (e.g., financial information, medical information, or authentication information, among other examples), and scanning the physical files may increase the risk of leakage of the confidential information.

Some implementations described herein enable a system to automatically detect datasets, in a data storage system, to be registered in a metadata repository. The system may receive inventory data that identifies file paths for objects stored in the data storage system. The system may detect patterns in prefixes of the file paths using one or more trained machine learning models, and the system may normalize the prefixes of the file paths based on the patterns detected in the prefixes. The system may detect datasets of the objects stored in the data storage system based on the normalized prefixes. The system may compare prefixes associated with the detected datasets with prefixes associated with a set of registered datasets that are registered with the metadata repository. The system may determine, based on comparing the prefixes associated with the detected datasets and the prefixes associated with the set of registered datasets, a respective registration classification for each detected dataset. As a result, the system may accurately and efficiently validate whether datasets in a data storage system are properly registered with a metadata repository and detect datasets that have not been registered. Furthermore, the method used by the system is highly scalable, and thus may be performed using parallel processing, resulting in fast data detection and registration classification. In addition, the dataset detection is based on file paths, and thus provides added security against leakage of confidential information as compared to other possible techniques for dataset detection that involve scanning the physical objects/files.

FIGS. 1A-1F are diagrams of an example 100 associated with machine learning based dataset detection. As shown in FIGS. 1A-1F, example 100 includes a model training system, a dataset detection system, a data storage system, a metadata repository, and a user device. These devices are described in more detail in connection with FIGS. 3 and 4.

As shown in FIG. 1A, and by reference number 105, the model training system may train one or more machine learning models. The model training system may train one or more pattern detection machine learning models to recognize patterns in prefixes of file paths (e.g., object keys) of objects stored in the data storage system.

In some implementations, the model training system may train one or more regular expression pattern detection machine learning models for detecting prefix portions associated with one or more regular expression patterns. For each regular expression pattern in a set of regular expression patterns, the model training system may train a respective regular expression pattern detection machine learning model that inputs prefix portions of a file path and detects whether the input prefix portions correspond to that regular expression pattern. The model training system may train each regular expression pattern detection machine learning model based on training data that includes examples from file paths of data registered with the metadata repository and examples prefix portions associated with the respective regular expression pattern.

A regular expression pattern may be any pattern that corresponds to a regular expression used in prefixes of file paths to organize data in the data storage system. For example, the set of regular expression patterns, for which machine learning models are trained, may include one or more date patterns, an instance identifier (ID) pattern, a globally unique identifier (GUID) pattern, a metadata repository log pattern, an email pattern, a user ID pattern, a hash pattern, a sequence, pattern, a temporary folder pattern, a digits pattern, or a sequence string pattern, among other examples. Additionally, and/or alternatively, the regular expression pattern set may include one or more regular expression patterns associated with a particular entity or organization. In some implementations, one or more of the regular expression patterns may be detected based on prefixes of file paths of objects in datasets registered with the metadata repository using K-means clustering. In some implementations, for each regular expression pattern, the respective regular expression pattern detection machine learning model may determine a probability score that corresponds to a probability of an input prefix portion being associated with that regular expression pattern.

The model training system may also train a gibberish detection machine learning model for detecting prefix portions associated with a gibberish pattern. As used herein, "gibberish" and "gibberish pattern" refer to an uncommonly used and/or seemingly random combination of characters. In some implementations, the gibberish detection machine learning model may be a Markov chain based machine learning model. A Markov chain is a stochastic model to describe a sequence of possible events assuming the probability of each event depends only on the state of the previous events. For an input sequence of characters in a prefix portion, the gibberish detection machine learning model may calculate a probability for each adjacent pair of characters in the prefix portion from the training data (e.g., based on the probability of that combination occurring in the training data) and may calculate an overall probability score for the sequence of characters as a product of the probabilities for the adjacent pairs of characters. For example, a gibberish detection machine learning model may calculate a probability for the term "hello" as P("hello")=P("he")*P("el")*P("ll")*P("lo"), wherein the probabilities of the adjacent pairs are calculated based on the training data.

The model training system may train the gibberish detection machine learning model to learn probabilities associated with various combinations of adjacent characters based on the training data. For example, for a given combination of a first character and a second character, the gibberish detection machine learning model may learn a probability that corresponds to a percentage of occurrences of the first character in the training data that are followed by the second character. In this case, a lower probability score for a prefix portion may correspond to a greater likelihood that the prefix portion is associated with a gibberish pattern. In some implementations, the model training system may set a probability score threshold for determining whether a prefix portion is associated with a gibberish pattern based on data analysis using the training data. In some implementations, the model training system may also set a string length threshold, which may be used together with the probability score threshold in determining whether a prefix portion is associated with a gibberish pattern, based on data analysis using the training data. In some implementations, the training data may include prefix portions from file paths of objects in datasets registered with the metadata repository. In some implementations, the training data may include prefixes that include entity-specific terminology for an entity that owns or controls the data stored in the data storage system.

As further shown in FIG. 1A, and by reference number 110, the model training system may transmit the one or more trained machine learning models to the dataset detection system. For example, the model training system may transmit, to the dataset detection system, the one or more trained regular expression pattern detection machine learning models and the trained gibberish detection machine learning model.

Figure 1B:
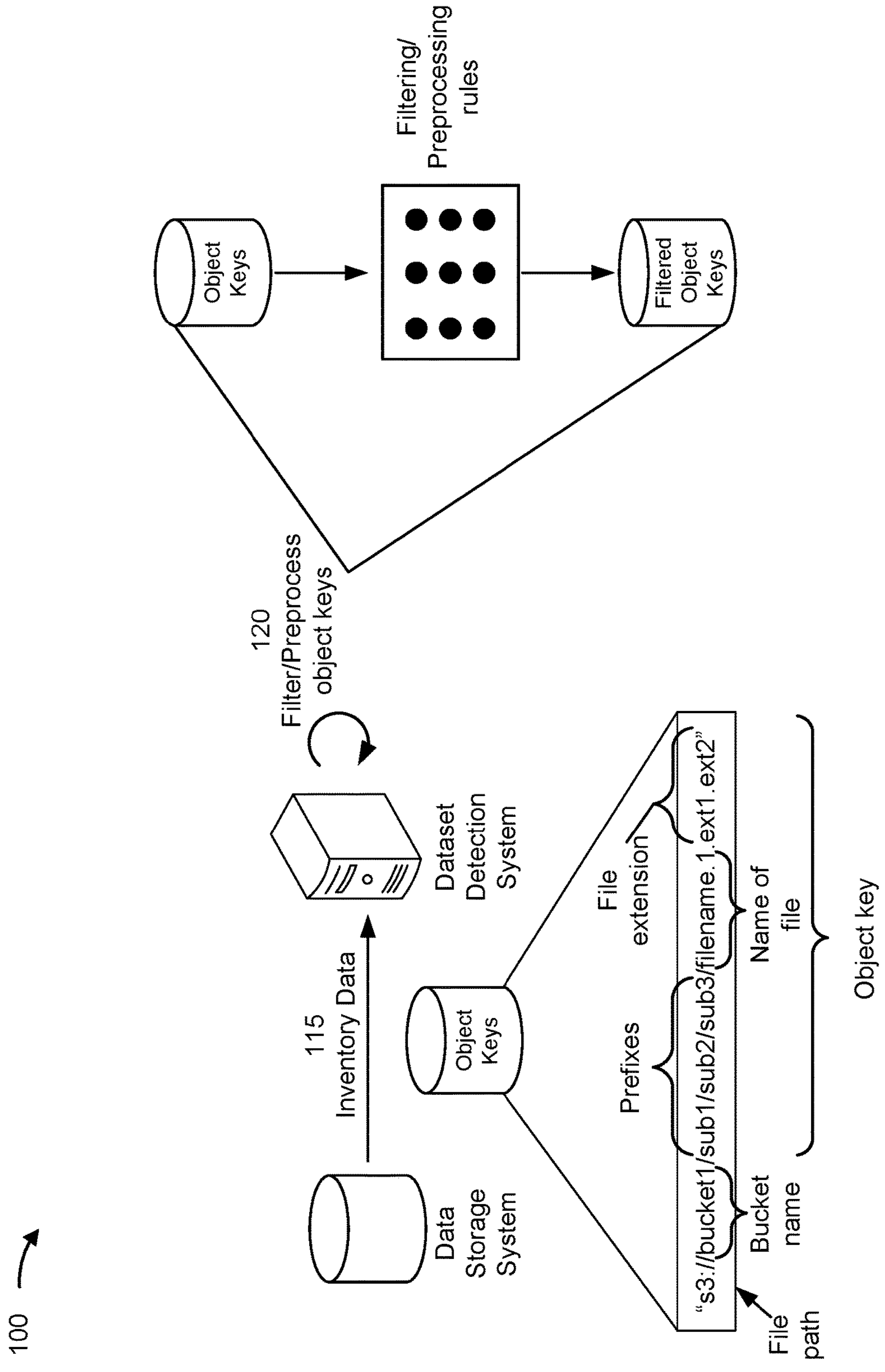

As shown in FIG. 1B, and by reference number 115, the dataset detection system may receive, from the data storage system, inventory data associated with the data storage system. The inventory data may identify file paths and/or object keys for objects stored in the data storage system. The data storage system may store data as objects (e.g., in an object storage system), files (e.g., in a file storage system), or data blocks (e.g., in a block storage system), among other examples. As used herein, "objects" and "files" may be used interchangeably to refer to the data stored in the data storage system. As shown in FIG. 1B, in some implementations, the file path, for an object stored in the data storage system, may include a bucket name and an object key. The bucket name may identify a bucket (e.g., in an object storage system) in which the object is stored. The object key may include one or more prefixes, a name of the object/file, and a file extension. The prefixes may identify a structure or hierarchy (e.g., sub-folders) used to store the object in the data storage system. The one or more prefixes in a file path may be referred to collectively as the prefix of the file path, and the individual portions (e.g., sub1, sub2, and sub3) of a prefix may be referred to as prefix portions.

As further shown in FIG. 1B, and by reference number 120, the dataset detection system may filter and/or preprocess the file paths or object keys for the objects stored in the data storage system. As shown in FIG. 1B, the dataset detection system may filter and/or pre-process the object keys (or the file paths) based on one or more filtering/preprocessing rules, resulting in a set of filtered object keys (or file paths). In some implementations, the dataset detection system may filter the object keys (or file paths) to remove object keys (or file paths) having non-data type file extensions from a set of object keys to be considered for dataset detection. For example, the dataset detection system may filter out object keys with non-data type file extensions, such as .png extensions, .jpeg extensions, or .py extensions, among other examples. Additionally, or alternatively, the dataset detection system may apply other filtering/pre-processing rules. For example, the dataset detection system may remove, from the set of object keys to be considered for dataset detection, object keys associated with metadata repository logs, object keys associated with deleted objects, object keys associated with empty objects, object keys associated with short-term objects, or object keys associated with code or configuration objects, among other examples. In some implementations, the filtering/pre-processing rules may be customized to include one or more entity-specific filtering or pre-processing rules.

Figure 1C:
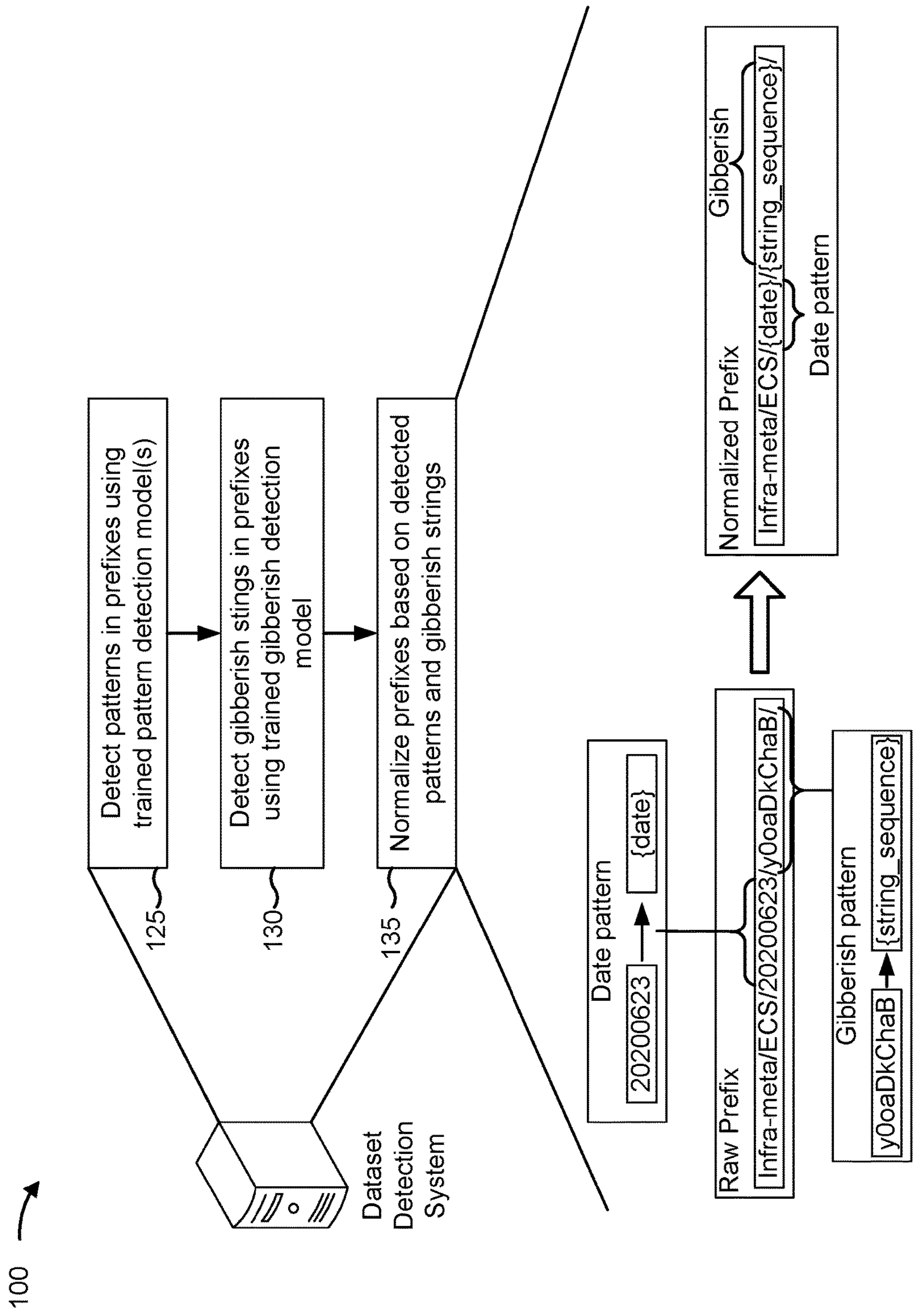

As shown in FIG. 1C, and by reference number 125, the dataset detection system may detect patterns in the prefixes of the file paths using the trained one or more pattern detection machine learning models. For example, for each file path or object key remaining after filtering is performed, the dataset detection system may input each of the prefix portions into the one or more pattern detection machine learning models to detect prefix portions that correspond to the patterns associated with the one or more pattern detection machine learning models. In some implementations, the dataset detection system may use the one or more trained regular expression pattern detection machine learning models to detect prefix portions associated with each regular expression pattern in the set of regular expression patterns. As described above, each of the one or more regular expression pattern detection machine learning models may detect whether an input prefix portion corresponds to a respective regular expression pattern in the set of regular expression patterns. In some implementations, a regular expression pattern detection machine learning model may determine a probability score for an input prefix portion, and the dataset detection system may determine that the input prefix portion is associated with the respective regular expression pattern based on a determination that the probability score satisfies (e.g., is greater than, or is greater than or equal to) a threshold.

As further shown in FIG. 1C, and by reference number 130, the dataset detection system may detect gibberish strings in the prefixes of the file paths using the trained gibberish detection machine learning model. For example, the dataset detection system may use the trained gibberish detection machine learning model to detect prefix portions that are associated with a gibberish pattern. As described above, the trained gibberish detection machine learning model may be a Markov chain based machine learning model that calculates a probability score for an input prefix portion based on probabilities of adjacent pairs of characters in the prefix portion, which are calculated based on the training data. For example, for an adjacent pair of characters in a prefix portion, the trained gibberish detection machine learning model may calculate the probability that the first character in the adjacent pair is followed by the second character in the adjacent pair based on a learned probability associated with that adjacent pair based on the training data.

In some implementations, the gibberish detection machine learning model may determine the probability score for an input prefix portion, and the dataset detection system may determine that the input prefix portion is associated with a gibberish pattern based on a determination that the probability score satisfies (e.g., is less than, or is less than or equal to) a probability score threshold. In some implementations, the determination, by the dataset detection system, that the input prefix portion is associated with a gibberish pattern may also be based on a determination that a string length of the prefix portion satisfies (e.g., is greater than, or is greater than or equal to) a string length threshold. As described above, the probability score threshold and/or the string length threshold may be set during training based on data analysis using the training data.

As further shown in FIG. 1C, and by reference number 135, the dataset detection system may normalize the prefixes of the file paths based on the detected patterns and gibberish strings in the prefixes, resulting in normalized prefixes for the objects stored in the data storage system. The dataset detection system may normalize the prefixes, based on the detected patterns in the prefixes, to reduce the overall amount of prefix data by grouping like normalized prefixes, and to format the prefixes into more logical and easy to read strings. In some implementations, the dataset detection system may normalize the prefixes by replacing prefix portions for which patterns are detected with labels associated with the detected patterns. For each of the regular expression patterns in the set of regular expression patterns, the dataset detection system may replace detected prefix portions associated with that regular expression pattern with a label associated with that regular expression pattern. For example, the dataset detection system may replace a prefix portion determined, using a regular expression pattern detecting machine learning model, to correspond to a date pattern with the label, "{date}." The dataset detection system may replace each prefix portion detected, using the gibberish detection machine learning model, as gibberish (e.g., associated with a gibberish pattern) with a label associated with the gibberish pattern. For example, the dataset detection system may replace a prefix portion determined to be associated with a gibberish pattern with the label, "{string_sequence}."

As shown in FIG. 1C, the dataset detection system may normalize a raw prefix associated with a data object, resulting in a normalized prefix. In the example of FIG. 1C, the dataset detection system may detect that the prefix portion 20200623, in the raw prefix, is associated with a date pattern, and the dataset detection system may detect that the prefix portion y0oaDkChaB, in the raw prefix, is associated with a gibberish pattern. In this case, the dataset detection system may replace 20200623, in the raw prefix, with {date} in the normalized prefix, and the dataset detection system may replace y0oaDkChaB, in the raw prefix, with {string_sequence} in the normalized prefix.

Figure 1D:
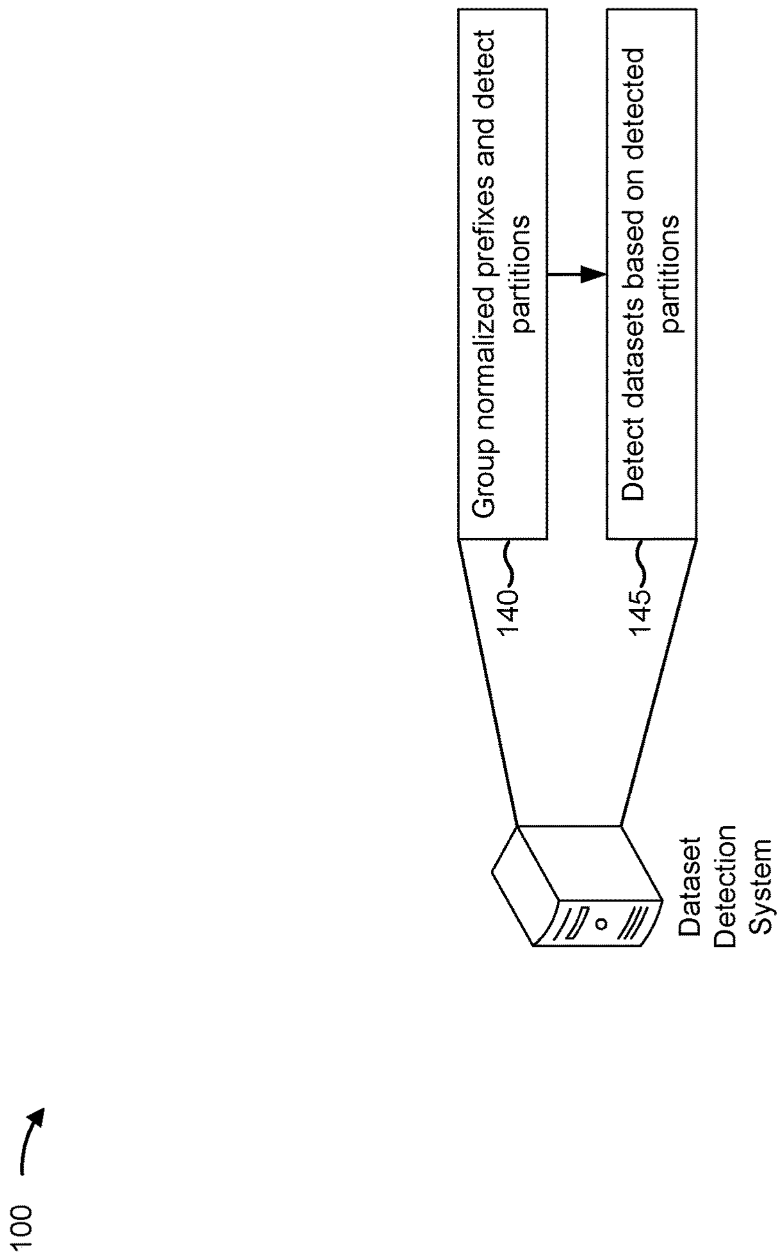

As shown in FIG. 1D, the dataset detection system may detect datasets of the objects stored in the data storage system based on the normalized prefixes. As shown by reference number 140, the data storage system may group the normalized prefixes and detect partitions based on the grouped prefixes. The dataset detection system may initially group objects stored in the dataset based on the normalized prefixes. Normalizing the prefixes by replacing detected regular expression patterns and detected gibberish patterns with labels may result in multiple objects having the same normalized prefix. In some implementations, the dataset detection system may group objects having the same normalized prefix together, resulting in grouped prefixes with a respective group of one or more objects associated with each grouped prefix.

The dataset detection system may detect partitions in the grouped prefixes. In some implementations, using the grouped prefixes, and starting with a first prefix of the set of grouped prefixes, the dataset detection system may apply another grouping up until a first detected pattern (e.g., a first label associated with a detected regular expression pattern or a detected gibberish pattern) in the first prefix, resulting in an updated grouping of objects and an updated grouped prefix associated with the updated grouping of objects. The dataset detection system may count a number of unique folders after the first pattern that are captured by the updated grouping. The dataset detection system may then determine whether a percentage of the objects included in the updated grouping that have the same file extension satisfies a first threshold (e.g., 95%). If the percentage satisfies the first threshold, the dataset detection system may then determine whether the number of unique folders after the first pattern satisfies a second threshold. If the number of unique folders satisfies the second threshold, the dataset detection system may determine that a valid partition has been detected at the first pattern. In this case, the objects remain grouped based on the updated grouping prefix (e.g., the first prefix up to the first pattern).

In a case in which the percentage of objects, in the updated grouping, that have the same file extension does not satisfy the first threshold, or the number of unique folders after the first pattern does not satisfy the second threshold, the dataset detection system may determine that a valid partition is not detected at the first pattern. In this case, the label associated with the first pattern may be returned to the original prefix portions for the objects grouped in the updated grouping, and the dataset detection system may proceed to perform partition detecting based on a next prefix portion or a second detected pattern in the first grouped prefix. In some implementations, the dataset detection system may perform partition detection, as described above for a first prefix in the set of grouped prefixes, for each of the prefixes in the set of group prefixes. This may result in an updated set of grouped prefixes, each associated with a respective group of objects, in which valid partitions remain and invalid partitions have been removed.

As further shown in FIG. 1D, and by reference number 145, the dataset detection system may detect datasets, and the prefixes associated with the detected datasets, based on the partitions detected in the grouped prefixes. For each prefix in the updated set of grouped prefixes, from which invalid partitions have been removed, the dataset detection system may apply one or more heuristics to determine whether the group of objects associated with that prefix is a valid detected dataset. In some implementations, for each prefix in the updated set of grouped prefixes, the dataset detection system may determine whether a size of the data stored in the group of objects associated with that prefix satisfies a threshold size. If the size of the data in the group of objects satisfies the threshold size, the dataset detection system may determine that the group of objects is a valid detected dataset. In this case, the grouped prefix associated with the group of data may be determined to be the prefix associated with the detected dataset. If the size of the data in the group of objects does not satisfy the threshold size, the dataset detection system may determine that the group of objects is not a valid detected dataset.

Figure 1E:
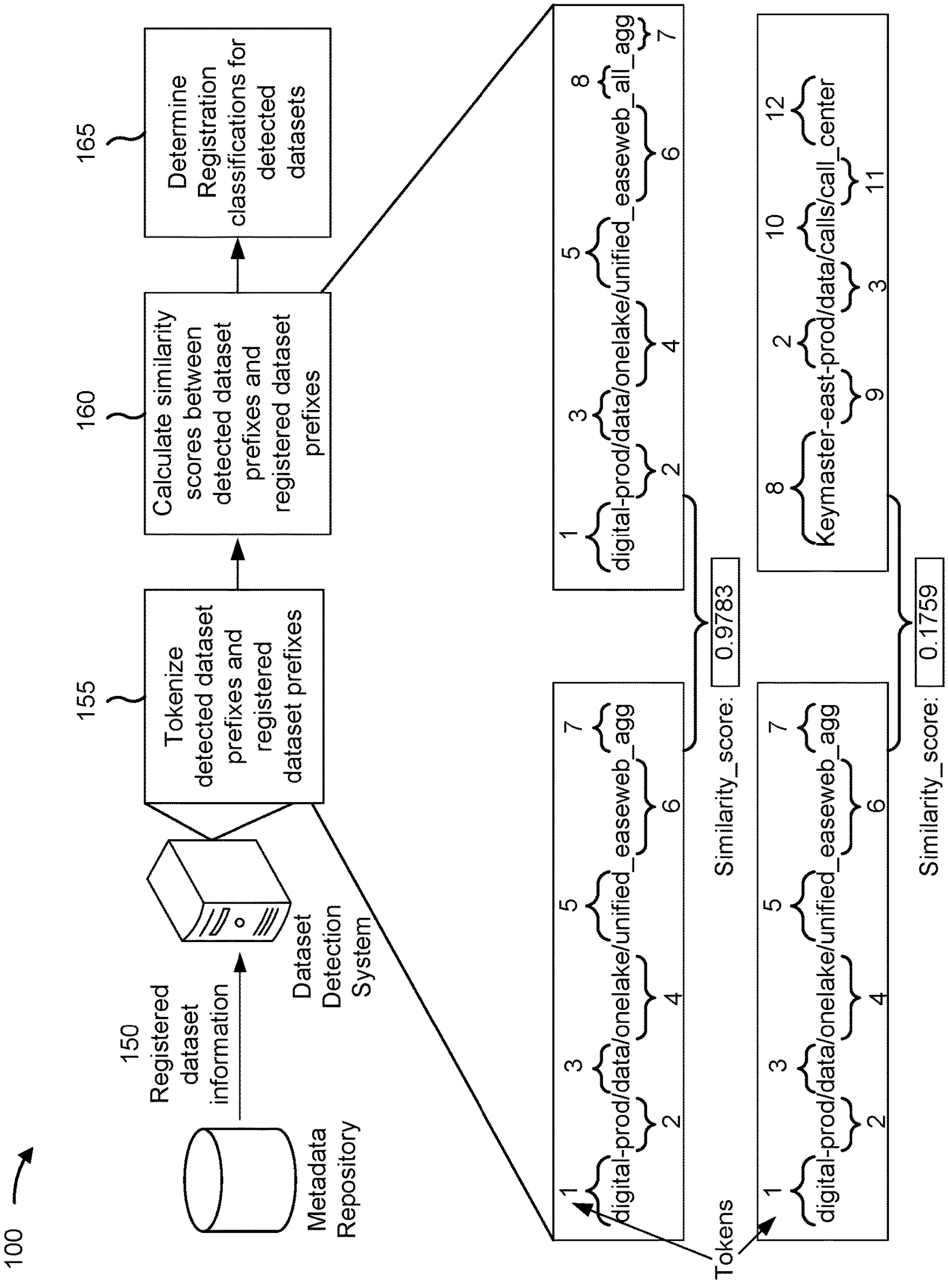

As shown in FIG. 1E, and by reference number 150, the dataset detection system may receive, from the metadata repository, registered dataset information associated with datasets of objects stored in the data storage system that are registered in the metadata repository. In some implementations, the registered dataset information may include respective prefixes and/or file paths (or object keys) associated with the registered datasets. In some implementations, the registered dataset information may include prefixes and/or file paths (or object keys) for the objects included in each of the registered datasets. In this case, the dataset detection system may detect regular expression patterns in the prefixes included in the registered dataset information using the one or more trained regular expression pattern detection machine learning models. Additionally, or alternatively, the dataset detection system may detect gibberish patterns in the prefixes included in the registered dataset information using the trained gibberish detection machine learning model. The dataset detection system may then normalize the prefixes based on the detected regular expression patterns and the detected gibberish patterns, as described above in connection with FIG. 1C. The dataset detection system may group the normalized prefixes of the objects in each of the registered datasets to determine a respective prefix for each registered dataset.

As further shown in FIG. 1E, the dataset detection system may compare the prefixes associated with the detected datasets with prefixes associated with the registered datasets. As shown by reference number 155, the dataset detection system may tokenize the prefixes associated with the detected datasets and the prefixes associated with the registered datasets. "Tokenization" refers to splitting text into smaller units, such as individual words or phrases. In some implementations, the model training system may apply a tokenizer that performs tokenization on the prefixes associated with the detected datasets and the registered datasets to split the prefixes into tokens that correspond to words or terms in the prefixes. For each prefix, the dataset detection system may convert the tokens (e.g., terms) in that prefix to numeric values, resulting in a vector of numeric values that represents that prefix. In this way, the dataset detection system may generate a first set of vectors representing the prefixes associated with the detected datasets and a second set of vectors representing the prefixes associated with the registered datasets.

In some implementations, the dataset detection system may generate the vector representing a prefix by calculating term frequency-inverse document frequency (TF-IDF) values for the terms (e.g., tokens) in the prefix. For each term in a prefix, the dataset detection system may calculate the TF-IDF value for that term by multiplying the term frequency (TF) of that term in the prefix and the inverse document frequency (IDF) of that term across the set of prefixes. In some implementations, the TF of a term may be calculated as a raw count of instances of that term in the prefix. In some implementations, the raw count of the term may be adjusted by a total number of terms in the prefix to calculate the TF of the term. In some implementations, the IDF may be calculated by dividing the total number of prefixes in the set of prefixes by the number of prefixes containing that term, and then taking the logarithm of that quotient. In some implementations, the IDF for a term in a prefix associated with a detected dataset may be calculated based on the number of prefixes containing that term in the set of prefixes associated with the detected datasets, and the IDF for a term in a prefix associated with a registered dataset may be calculated based on the number of prefixes containing that term in the set of prefixes associated with the registered datasets. In some implementations, the IDF for a term in a prefix may be calculated based on the number of prefixes containing that term in the set of prefixes, including the prefixes associated with the detected datasets and the prefixes associated with the registered datasets. In some implementations, the dataset detection system may generate the first and second sets of vectors using one or more other natural language processing techniques to calculate the numeric values to represent the terms of the prefixes.

As further shown in FIG. 1E, and by reference number 160, the dataset detection system may calculate similarity scores between the prefixes associated with the detected datasets and the prefixes associated with the registered datasets. In some implementations, the dataset detection system may calculate similarity scores between the first set of vectors, representing the prefixes associated with the detected datasets, and the second set of vectors, representing the prefixes associated with the registered datasets. For example, for each vector in the first set of vectors, the dataset detection system may calculate similarity scores between that vector and each vector in the second set of vectors. The similarity score may be a measure of similarity between a vector representing a prefix associated with a detected dataset (e.g., a vector in the first set of vectors) and a vector representing a prefix associated with a registered dataset (e.g., a vector in the second set of vectors). For example, the dataset detection system may calculate the similarity score as at least one of a cosine similarity, an edit distance, a Jaccard distance, or a combination thereof.

In some implementations, the dataset detection system may combine the first set of vectors into a first matrix and combine the second set of vectors into a second matrix. For example, the first matrix may include TF-IDF vectors representing all of the detected datasets and the second matrix may include TF-IDF vectors representing all of the registered datasets. The dataset detection system may calculate a similarity score between each vector in the first matrix and each vector in the second matrix, resulting in a similarity matrix that includes, for each vector in the first matrix (e.g., for each prefix associated with a detected dataset), a respective vector of similarity scores that includes similarity scores for all of the vectors in the second matrix (e.g., for each prefix associated with a registered dataset).

As further shown in FIG. 1E, and by reference number 165, the dataset detection system may determine registration classifications for the detected datasets. The dataset detection system may determine a respective registration classification for each detected dataset based on the comparison of the prefixes associated with the detected datasets and the prefixes associated with the registered datasets. In some implementations, the dataset detection system may determine, for each detected dataset, a closest (e.g., most similar) registered dataset in the set of registered datasets based on the similarity scores between the first set of vectors and the second set of vectors. For example, the dataset detection system may determine, for each detected dataset, a highest similarity score calculated for that detected dataset (e.g., for the corresponding vector in the set of first vectors). For each detected dataset, the closest registered dataset may be the registered dataset corresponding to the vector, in the second set of vectors, that results in the highest similarity score for that detected dataset.

The dataset detection system may determine the registration classification for a detected dataset based on the similarity score between the vectors representing the detected dataset and the closest registered dataset (e.g., the highest similarity score for the detected dataset). In some implementations, the registration classification for the detected dataset may be a predicted classification of whether the detected dataset is registered with the metadata repository or not. For example, for each detected dataset, the dataset detection system may compare the highest similarity score for that detected dataset to a threshold (e.g., 0.85). In this case, the dataset detection system may classify the detected dataset as already registered in the metadata repository based on a determination that the highest similarity score for the detected dataset satisfies (e.g., is greater than or equal to) the threshold, and the dataset detection system may classify the detected dataset as not registered in the metadata repository based on a determination that the highest similarity score for the detected dataset does not satisfy the threshold.

In some implementations, the dataset detection system may determine the registration classification for each detected dataset from among a set of possible classes that includes more than two possible classes. For example, the dataset detection system may classify a detected dataset into one of a first class (e.g., already registered), a second class (e.g., likely already registered), a third class (e.g., needs to be registered), or a fourth class (e.g., no need to be registered). In this case, the dataset detection system may classify the detected dataset into the first class (e.g., already registered) based on a determination that the highest similarity score for the detected dataset satisfies (e.g., is greater than or equal to) a first threshold (e.g., 0.97). The dataset detection system may classify the detected dataset into the second class (e.g., likely already registered) based on a determination that the highest similarity score for the detected dataset satisfies (e.g., is greater than or equal to) a second threshold (e.g., 0.85) but does not satisfy the first threshold. The dataset detection system may classify the detected dataset into the third class (e.g., needs to be registered) based on a determination that the highest similarity score for the detected dataset satisfies (e.g., is greater than or equal to) a third threshold (e.g., 0.10) but does not satisfy the second threshold. The dataset detection system may classify the detected dataset into the fourth class (e.g., no need to be registered) based on a determination that the highest similarity score for the detected dataset does not satisfy the third threshold. For example, the fourth class may correspond to a detected dataset with a prefix that is not similar to any prefixes of the registered datasets, and therefore may be an incorrectly detected dataset or a dataset associated with an object type that is not to be registered in the metadata repository. Accordingly, the fourth class may act as an additional check on the accuracy of the dataset detection.

As shown in FIG. 1F, and by reference number 170, the dataset detection system may transmit, to a user device, the dataset detection and registration classification results. For example, the dataset detection system may transmit, to the user device, information identifying the detected datasets in the data storage system and the respective registration classification determined for each of the detected datasets. In some implementations, the information may identify, for each detected dataset, a bucket in the data storage system associated with the detected dataset, a prefix (and/or object key or file path) associated with the detected dataset, a prefix (and/or object key or file path) associated with the closest registered dataset for the detected dataset, a classification indication, a total number of objects in the data storage system included within the detected dataset, and/or the similarity score between the detected dataset and the closest registered dataset. The classification indication may indicate, for a detected dataset, the registration classification result and/or a registration recommendation based on the registration classification result.

In some implementations, the user device, based on receiving the dataset detection and registration classification results, may register one or more detected datasets with the metadata repository. For example, the user device may register, with the metadata repository, one or more detected datasets classified as not registered or needing to be registered (e.g., the third class).

As indicated above, FIGS. 1A-1F are provided as an example. Other examples may differ from what is described with regard to FIGS. 1A-1F.

Figure 2:
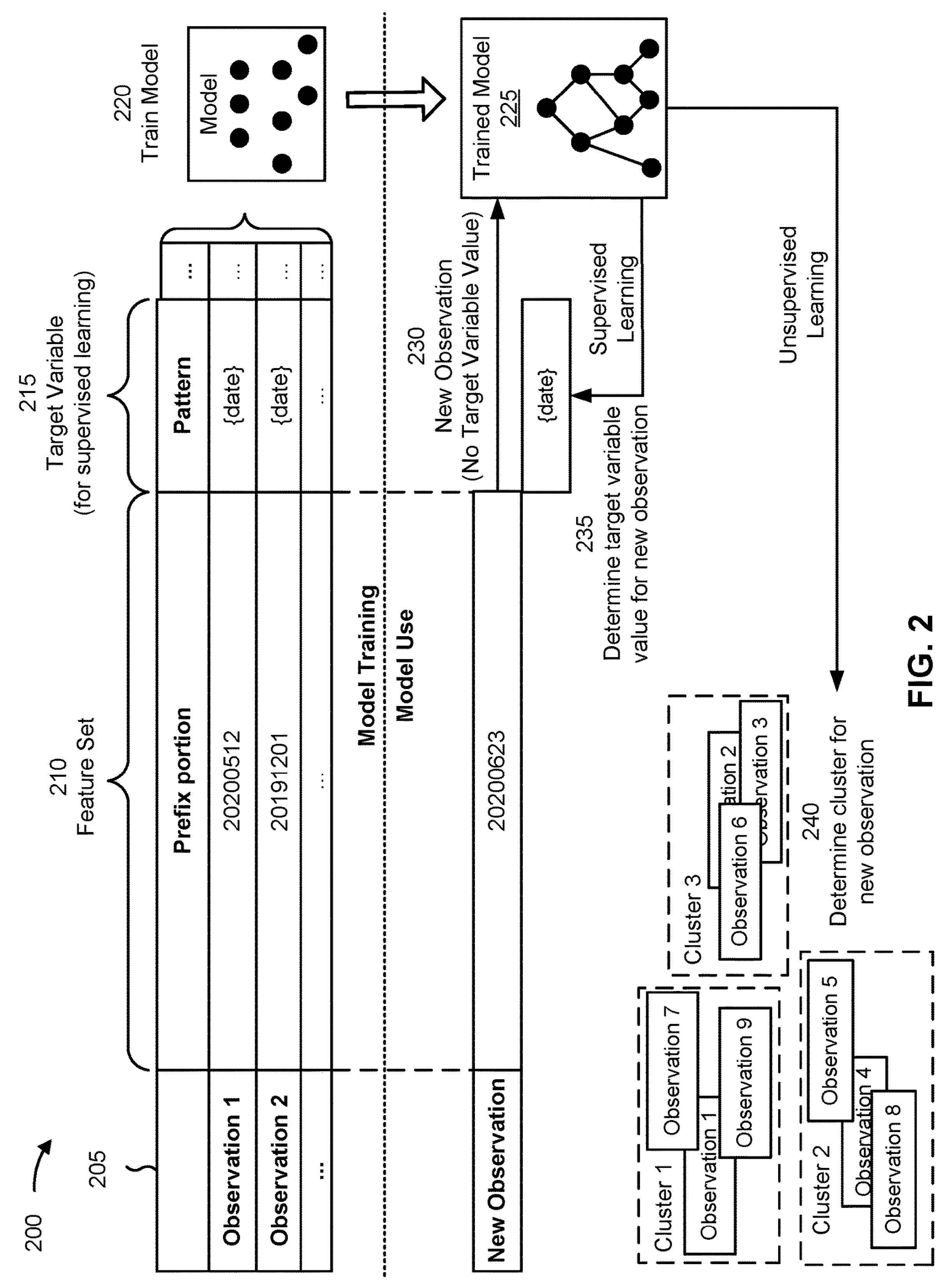
FIG. 2 is a diagram illustrating an example 200 of training and using a machine learning model in connection with machine learning based dataset detection.

FIG. 2 is a diagram illustrating an example 200 of training and using a machine learning model in connection with machine learning based dataset detection. The machine learning model training and usage described herein may be performed using a machine learning system. The machine learning system may include or may be included in a computing device, a server, a cloud computing environment, or the like, such as the model training system 310 and the dataset detection system 320 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the data storage system 330 and/or the metadata repository 340, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data storage system 330 and/or the metadata repository 340. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a feature of a prefix portion. As shown, for a first observation, the feature may have a value of 20200512, for a second observation, the feature may have a value of 20191201, and so on. These features and feature values are provided as examples, and may differ in other examples. For example, the feature set may include one or more features extracted from prefix portions using one or more natural language processing techniques.

As shown by reference number 215, the set of observations may be associated with a target variable. The target variable may represent a variable having a numeric value, a variable having a numeric value that falls within a range of values or has some discrete possible values, a variable that is selectable from one of multiple options (e.g., one of multiple classes, classifications, or labels) and/or a variable having a Boolean value. A target variable may be associated with a target variable value, and a target variable value may be specific to an observation. In example 200, the target variable is a pattern classification, which has a value of {date} for the first observation.

The feature set and target variable described above are provided as examples, and other examples may differ from what is described above. For example, the target variable may be a numeric value representing a type of pattern classification or a numeric value representing whether or not the feature set is associated with a particular type of pattern classification, such as a regular expression pattern or a gibberish pattern.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a prefix portion feature of 20200623, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of {date} for the target variable of a pattern classification for the new observation, as shown by reference number 235. Based on this prediction, the machine learning system may provide a first recommendation and/or output for determination of a first recommendation. The first recommendation may include, for example, a recommendation that the prefix portion associated with the new observation is associated with a date pattern. Additionally, or alternatively, the machine learning system may perform a first automated action, and/or may cause a first automated action to be performed (e.g., by instructing another device to perform the automated action). The first automated action may include, for example, replacing the prefix portion associated with the new observation with a label corresponding to the date pattern.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a date pattern cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., an email pattern cluster), then the machine learning system may provide a second (e.g., different) recommendation (e.g., a recommendation that the prefix portion associated with the new observation is associated with an email pattern) and/or may perform or cause performance of a second (e.g., different) automated action, such as replacing the prefix portion associated with the new observation with a label corresponding to the email pattern.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect patterns in prefixes of objects stored in a data storage system, detect datasets of the objects stored in the data storage system, and/or determine whether the detected datasets are registered with a metadata repository. The machine learning system enables recognition and/or identification of tens, hundreds, thousands, or millions of features and/or feature values for tens, hundreds, thousands, or millions of observations, thereby increasing accuracy and consistency and reducing delay associated with detecting patterns in prefixes of objects stored in a data storage system, detecting datasets of the objects stored in the data storage system, and/or determining whether the detected datasets are registered with a metadata repository, relative to requiring computing resources to be allocated for tens, hundreds, or thousands of operators to manually detect patterns in prefixes of objects stored in a data storage system, detect datasets of the objects stored in the data storage system, and/or determine whether the detected datasets are registered with a metadata repository using the features or feature values.

As indicated above, FIG. 2 is provided as an example. Other examples may differ from what is described in connection with FIG. 2.

Figure 3:
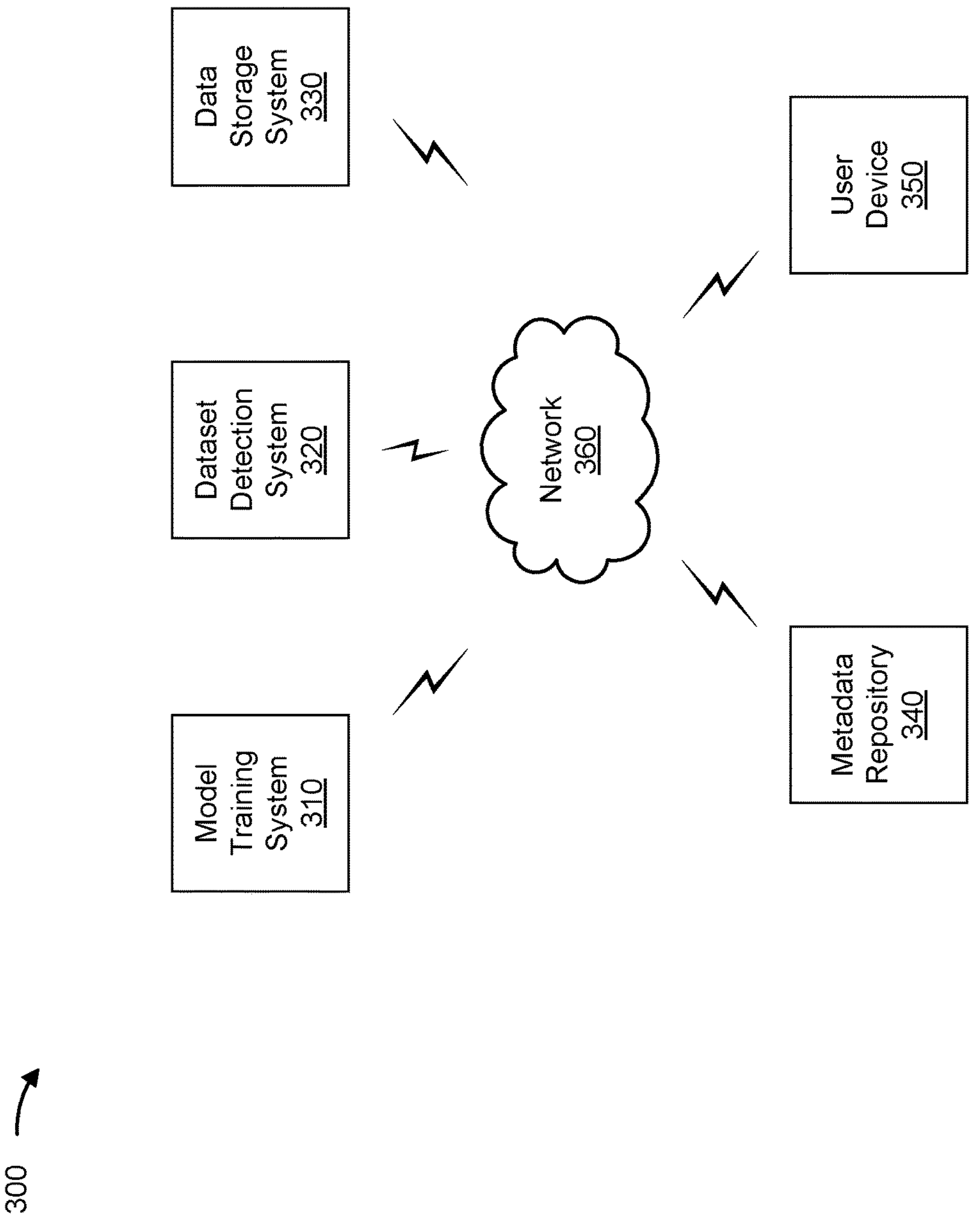
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a model training system 310, a dataset detection system 320, a data storage system 330, a metadata repository 340, a user device 350, and a network 360. Devices of environment 300 may interconnect via wired connections, wireless connections, or a combination of wired and wireless connections.

The model training system 310 includes one or more devices capable of receiving, generating, storing, processing, providing, and/or routing information associated with machine learning based dataset detection, as described elsewhere herein. The model training system 310 may include a communication device and/or a computing device. For example, the model training system 310 may include a server, such as an application server, a client server, a web server, a database server, a host server, a proxy server, a virtual server (e.g., executing on computing hardware), or a server in a cloud computing system. In some implementations, the model training system 310 includes computing hardware used in a cloud computing environment.

The dataset detection system 320 includes one or more devices capable of receiving, generating, storing, processing, providing, and/or routing information associated with machine learning based dataset detection, as described elsewhere herein. The dataset detection system 320 may include a communication device and/or a computing device. For example, the dataset detection system 320 may include a server, such as an application server, a client server, a web server, a database server, a host server, a proxy server, a virtual server (e.g., executing on computing hardware), or a server in a cloud computing system. In some implementations, the dataset detection system 320 includes computing hardware used in a cloud computing environment.

The data storage system 330 includes one or more devices capable of receiving, generating, storing, processing, and/or providing information associated with machine learning based dataset detection, as described elsewhere herein. The data storage system 330 may include a communication device and/or a computing device. For example, the data storage system 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data storage system 330 may communicate with one or more other devices of environment 300, as described elsewhere herein. In some implementations, the data storage system 330 may include a cloud storage system. In some implementations, the data storage system may include an object storage system, a file storage system, a block storage system, or a combination thereof.

The metadata repository 340 includes one or more devices capable of receiving, generating, storing, processing, and/or providing information associated with machine learning based dataset detection, as described elsewhere herein. The metadata repository 340 may include a communication device and/or a computing device. For example, the metadata repository 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The metadata repository 340 may communicate with one or more other devices of environment 300, as described elsewhere herein. In some implementations, the metadata repository 340 may store, track, and/or manage metadata for data objects stored in the data storage system 330.

The user device 350 includes one or more devices capable of receiving, generating, storing, processing, and/or providing information associated with machine learning based dataset detection, as described elsewhere herein. The user device 350 may include a communication device and/or a computing device. For example, the user device 350 may include a wireless communication device, a mobile phone, a user equipment, a laptop computer, a tablet computer, a desktop computer, a server, or a similar type of device.

The network 360 includes one or more wired and/or wireless networks. For example, the network 360 may include a cellular network, a public land mobile network, a local area network, a wide area network, a metropolitan area network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
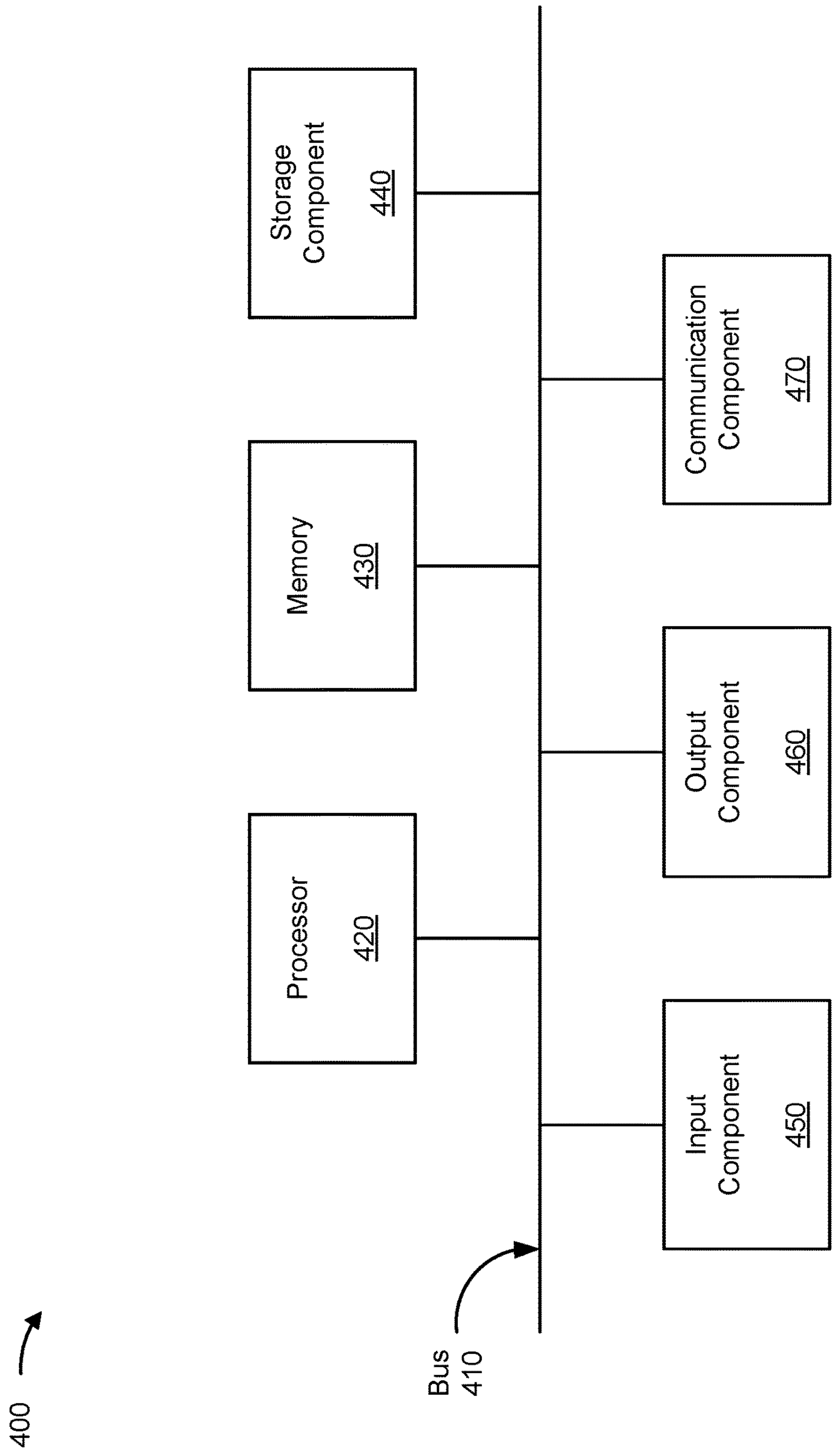
FIG. 4 is a diagram of example components of one or more devices of FIG. 3.

FIG. 4 is a diagram of example components of a device 400, which may correspond to the model training system 310, the dataset detection system 320, the data storage system 330, the metadata repository 340, and/or the user device 350. In some implementations, the model training system 310, the dataset detection system 320, the data storage system 330, the metadata repository 340, and/or the user device 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
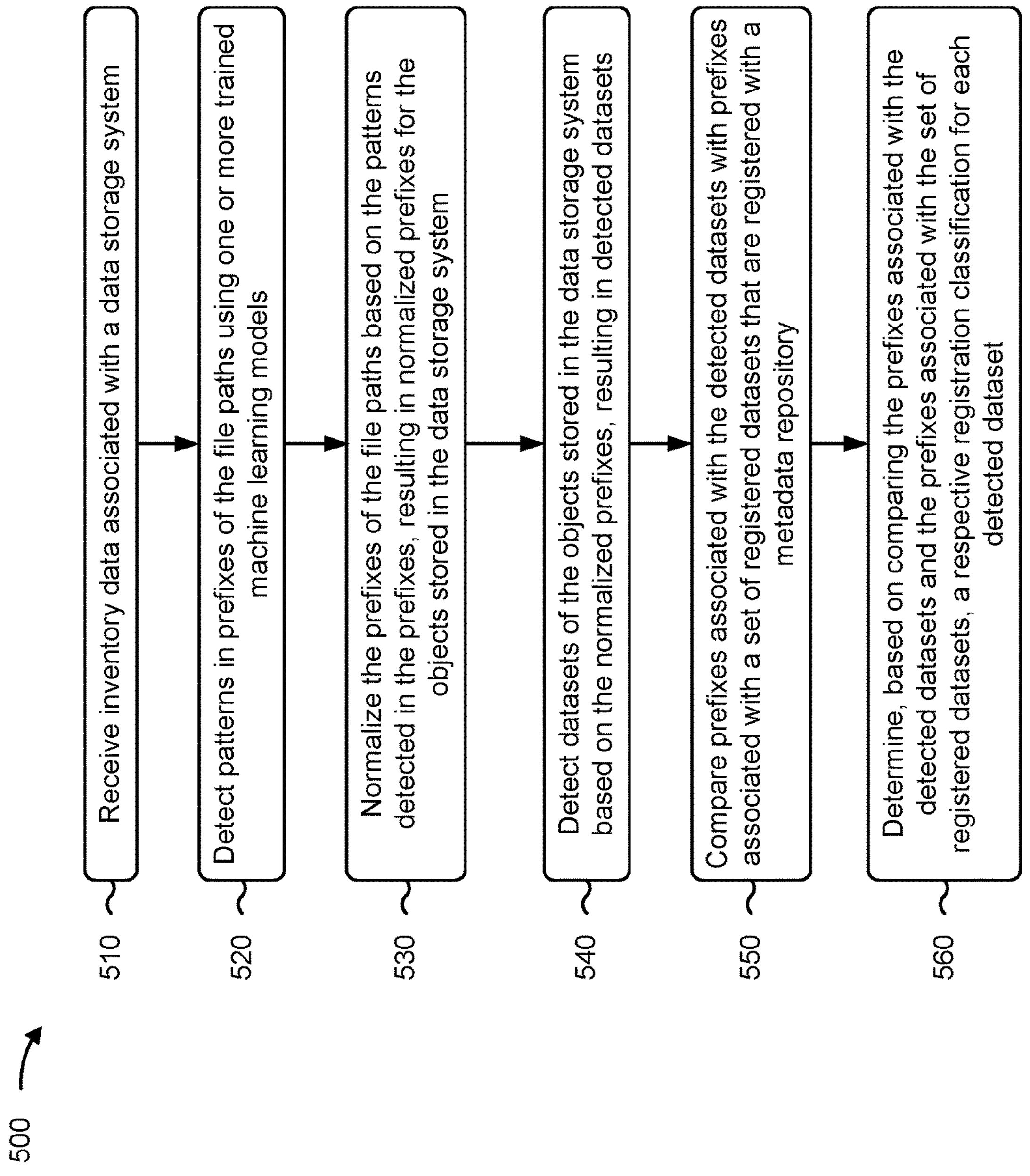
FIG. 5 is a flowchart of an example process relating to machine learning based dataset detection.

FIG. 5 is a flowchart of an example process 500 associated with machine learning based dataset detection. In some implementations, one or more process blocks of FIG. 5 may be performed by a system (e.g., the dataset detection system 320). In some implementations, one or more process blocks of FIG. 5 may be performed by another device or a group of devices separate from or including the system, such as the model training system 310, the data storage system 330, the metadata repository 340, and/or the user device 350. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving inventory data associated with a data storage system (block 510). In some implementations, the inventory data identifies file paths for objects stored in the data storage system. As further shown in FIG. 5, process 500 may include detecting patterns in prefixes of the file paths using one or more trained machine learning models (block 520). As further shown in FIG. 5, process 500 may include normalizing the prefixes of the file paths based on the patterns detected in the prefixes, resulting in normalized prefixes for the objects stored in the data storage system (block 530). As further shown in FIG. 5, process 500 may include detecting datasets of the objects stored in the data storage system based on the normalized prefixes, resulting in detected datasets (block 540). As further shown in FIG. 5, process 500 may include comparing prefixes associated with the detected datasets with prefixes associated with a set of registered datasets that are registered with a metadata repository (block 550). As further shown in FIG. 5, process 500 may include determining, based on comparing the prefixes associated with the detected datasets and the prefixes associated with the set of registered datasets, a respective registration classification for each detected dataset (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Accordingly, the scope of the invention should be determined not by the embodiments illustrated, but by the appended claims and their equivalents.

What is claimed is:

1. A system comprising:

one or more memories; and one or more processors, communicatively coupled to the one or more memories, configured to:

receive inventory data associated with a data storage system, wherein the inventory data identifies file paths for objects stored in the data storage system, wherein a quantity of the objects stored in the data storage system is greater than one billion;

detect patterns in prefixes of the file paths using one or more trained machine learning models;

normalize the prefixes of the file paths based on the patterns in the prefixes of the file paths, resulting in normalized prefixes for the objects stored in the data storage system;

group the objects stored in the data storage system based on the normalized prefixes, resulting in groups of objects associated with respective grouped prefixes;

count a number of unique folders in a group;

determine a percentage of objects included in the group have a same file extension;

determine a valid partition based on comparing the percentage to a threshold;

detect, based on the valid partition, based on the file paths, and based on the normalized prefixes, datasets of the objects stored in the data storage system, resulting in detected datasets, wherein detecting the detected datasets based on the file paths provides a first level of information security associated with preventing leakage of confidential information, and wherein the first level of information security is higher than a second level of information security associated with scanning the objects stored in the data storage system;

receive, from a metadata repository that manages metadata for the objects stored in the data storage system, registered dataset information associated with a set of registered datasets that are registered with the metadata repository;

compare prefixes associated with the detected datasets with prefixes associated with the set of registered datasets;

determine, based on comparing the prefixes associated with the detected datasets and the prefixes associated with the set of registered datasets, a respective registration classification for each detected dataset from among a set of possible classes that includes more than two possible classes, wherein the respective registration classification indicates predictions of whether a detected dataset is registered with the metadata repository and whether the detected dataset needs to be registered with the metadata repository; and transmit, to a computing device, information identifying the detected datasets in the data storage system and the respective registration classification determined for each detected dataset.

2. The system of claim 1, wherein the one or more processors are further configured to:

filter the file paths for the objects stored in the data storage system based on one or more filtering rules, prior to detecting the patterns in the prefixes of the file paths.

3. The system of claim 2, wherein the one or more processors, to filter the file paths for the objects stored in the data storage system, are configured to:

remove file paths for objects with non-data file extensions.

4. The system of claim 1, wherein the one or more processors, to detect the patterns in the prefixes of the file paths, are configured to:

determine a first probability that a first portion of the prefixes of the file paths are associated with regular expressions;

determine a second probability that a second portion of the prefixes of the file paths is associated with gibberish patterns;

detect respective portions of the prefixes associated with each regular expression pattern in a set of regular expression patterns using one or more trained regular expression pattern detection machine learning models; and detect portions of the prefixes associated with the gibberish patterns using a trained gibberish detection machine learning model.

5. The system of claim 4, wherein, the one or more processors, to normalize the prefixes of the file paths based on the patterns in the prefixes of the file paths, are configured to: replace the respective portions of the prefixes associated with each regular expression pattern with a label associated with that regular expression pattern; and replace the portions of the prefixes associated with the gibberish patterns with a label associated with the gibberish patterns.

6. The system of claim 1, wherein the one or more processors, to compare the prefixes associated with the detected datasets with the prefixes associated with the set of registered datasets, are configured to:

tokenize the prefixes associated with the detected datasets and the prefixes associated with the set of registered datasets, resulting in a first set of vectors representing the prefixes associated with the detected datasets and a second set of vectors representing the prefixes associated with the set of registered datasets; and calculate similarity scores between the first set of vectors and the second set of vectors.

7. The system of claim 6, wherein the one or more processors, to tokenize the prefixes associated with the detected datasets and the prefixes associated with the set of registered datasets, are configured to:

calculate term frequency-inverse document frequency (TF-IDF) values for terms in the prefixes associated with the detected datasets and the prefixes associated with the set of registered datasets.

8. The system of claim 6, wherein the one or more processors, to calculate the similarity scores between the first set of vectors and the second set of vectors, are configured to:

calculate at least one of a cosine similarity, an edit distance, or a Jaccard distance between each vector in the first set of vectors and each vector in the second set of vectors.

9. The system of claim 6, wherein the one or more processors, to determine the respective registration classification for each detected dataset, are configured to:

determine, for each detected dataset, a closest dataset in the set of registered datasets based on the similarity scores between the first set of vectors and the second set of vectors; and determine, for each detected dataset, the respective classification based on a similarity score between a vector, in the first set of vectors, representing the detected dataset, and a vector, in the second set of vectors, representing the closest dataset in the set of registered datasets.

10. The system of claim 1, wherein to group the objects stored in the data storage system, the one or more processors are configured to:

group the quantity of the objects.

11. The system of claim 1, wherein the one or more trained machine learning models comprise one or more of a supervised machine learning model that is trained using a set of observations that includes one or more target variable values or an unsupervised machine learning model that is trained using a set of observations that does not include the one or more target variable values.

12. A method comprising:

receiving, by a system, inventory data associated with a data storage system, wherein the inventory data identifies file paths for objects stored in the data storage system, wherein a quantity of the objects stored in the data storage system is greater than one billion;

detecting, by the system, patterns in prefixes of the file paths using one or more trained machine learning models;

normalizing, by the system, the prefixes of the file paths based on the patterns in the prefixes of the file paths, resulting in normalized prefixes for the objects stored in the data storage system;

grouping the objects stored in the data storage system based on the normalized prefixes, resulting in groups of objects associated with respective grouped prefixes;

counting a number of unique folders in a group;

determining a percentage of objects included in the group have a same file extension;

determining a valid partition based on comparing the percentage to a threshold;

detecting, by the system, based on the valid partition, based on the file paths, and based on the normalized prefixes, datasets of the objects stored in the data storage system, resulting in detected datasets, wherein detecting the detected datasets based on the file paths provides a first level of information security associated with preventing leakage of confidential information, and wherein the first level of information security is higher than a second level of information security associated with scanning the objects stored in the data storage system;

receiving, by the system and from a metadata repository that manages metadata for the objects stored in the data storage system, registered dataset information associated with a set of registered datasets that are registered with the metadata repository;

comparing, by the system, prefixes associated with the detected datasets with prefixes associated with the set of registered datasets; and determining, by the system, based on comparing the prefixes associated with the detected datasets and the prefixes associated with the set of registered datasets, a respective registration classification for each detected dataset from among a set of possible classes that includes more than two possible classes, wherein the respective registration classification indicates predictions of whether a detected dataset is registered with the metadata repository and whether the detected dataset needs to be registered with the metadata repository.

13. The method of claim 12, wherein detecting the patterns in the prefixes of the file paths comprises:

detecting respective portions of the prefixes associated with each regular expression pattern in a set of regular expression patterns using one or more trained regular expression pattern detection machine learning models; and detecting portions of the prefixes associated with a gibberish pattern using a trained gibberish detection machine learning model.

14. The method of claim 13, wherein normalizing the prefixes of the file paths based on the patterns in the prefixes of the file paths comprises:

replacing the respective portions of the prefixes associated with each regular expression pattern with a label associated with that regular expression pattern, wherein replacing the respective portions of the prefixes comprises:

replacing a first portion of the prefixes of the file paths with a first label associated with a regular expression pattern, and replacing a third portion of the prefixes of the file paths that correspond to another regular expression pattern used in the prefixes of the file paths with a second label associated with the other regular expression pattern; and replacing the portions of the prefixes associated with the gibberish pattern with a label associated with the gibberish pattern.

15. The method of claim 12, wherein comparing the prefixes associated with the detected datasets with the prefixes associated with the set of registered datasets comprises:

tokenizing the prefixes associated with the detected datasets and the prefixes associated with the set of registered datasets, resulting in a first set of vectors representing the prefixes associated with the detected datasets and a second set of vectors representing the prefixes associated with the set of registered datasets; and calculating similarity scores between the first set of vectors and the second set of vectors.

16. The method of claim 15, wherein determining the respective registration classification for each detected dataset comprises:

determining, for each detected dataset, a closest dataset in the set of registered datasets based on the similarity scores between the first set of vectors and the second set of vectors; and determining, for each detected dataset, the respective registration classification based on a similarity score between a vector, in the first set of vectors, representing the detected dataset, and a vector, in the second set of vectors, representing the closest dataset in the set of registered datasets.

17. The method of claim 12, further comprising:

transmitting, to a computing device, information identifying the detected datasets in the data storage system and the respective registration classification determined for each detected dataset.

18. A non-transitory computer-readable medium storing a set of instructions, the set of instructions comprising:

one or more instructions that, when executed by one or more processors of a device, cause the device to:

receive inventory data associated with a data storage system, wherein the inventory data identifies file paths for objects stored in the data storage system, wherein a quantity of the objects stored in the data storage system is greater than one billion;

detect patterns in prefixes of the file paths using one or more trained machine learning models;

normalize the prefixes of the file paths based on the patterns in the prefixes of the file paths, resulting in normalized prefixes for the objects stored in the data storage system;

group the objects stored in the data storage system based on the normalized prefixes, resulting in groups of objects associated with respective grouped prefixes;

count a number of unique folders in a group;

determine a percentage of objects included in the group have a same file extension;

determine a valid partition based on comparing the percentage to a threshold;

detect, based on the valid partition, based on the file paths, and based on the normalized prefixes, datasets of the objects stored in the data storage system, resulting in detected datasets, wherein detecting the detected datasets based on the file paths provides a first level of information security associated with preventing leakage of confidential information, and wherein the first level of information security is higher than a second level of information security associated with scanning the objects stored in the data storage system;

receive, from a metadata repository that manages metadata for the objects stored in the data storage system, registered dataset information associated with a set of registered datasets that are registered with the metadata repository;

compare prefixes associated with the detected datasets with prefixes associated with the set of registered datasets; and determine, based on comparing the prefixes associated with the detected datasets and the prefixes associated with the set of registered datasets, a respective registration classification for each detected dataset from among a set of possible classes that includes more than two possible classes, wherein the respective registration classification indicates predictions of whether a detected dataset is registered with the metadata repository and whether the detected dataset needs to be registered with the metadata repository.

19. The non-transitory computer-readable medium of claim 18, wherein the one or more instructions that cause the device to compare the prefixes associated with the detected datasets with the prefixes associated with the set of registered datasets, cause the device to:

tokenize the prefixes associated with the detected datasets and the prefixes associated with the set of registered datasets, resulting in a first set of vectors representing the prefixes associated with the detected datasets and a second set of vectors representing the prefixes associated with the set of registered datasets; and calculate similarity scores between the first set of vectors and the second set of vectors.

* * * * *